United States Patent
Croslin et al.

[19]

[11] Patent Number: 5,959,969
[45] Date of Patent: Sep. 28, 1999

[54] METHOD FOR INITIATING A DISTRIBUTED RESTORATION PROCESS

[75] Inventors: William D. Croslin; Steve Sellers, both of Colorado Springs, Colo.; Mark Sees, Plano, Tex.

[73] Assignee: MCI Communications Corporation, Washington, D.C.

[21] Appl. No.: 08/910,697

[22] Filed: Aug. 13, 1997

[51] Int. Cl.[6] .................................................. G01R 31/08
[52] U.S. Cl. ..................................... 370/216; 395/182.02
[58] Field of Search ..................................... 370/217, 218, 370/216, 225, 228, 254; 340/825.01, 827; 395/181, 182.02, 183.01, 183.16, 183.19, 200.68, 200.69; 379/220, 221, 271, 272, 273

[56] References Cited

U.S. PATENT DOCUMENTS

| | | | |
|---|---|---|---|
| 4,577,066 | 3/1986 | Bimonte et al. | |
| 4,920,529 | 4/1990 | Sasaki et al. | |
| 5,146,452 | 9/1992 | Pekarske | 370/228 |
| 5,187,740 | 2/1993 | Swaim et al. | 379/209 |
| 5,335,268 | 8/1994 | Kelly, Jr. et al. | 379/112 |
| 5,459,716 | 10/1995 | Fahim et al. | |
| 5,463,615 | 10/1995 | Steinhorn | |
| 5,590,119 | 12/1996 | Moran et al. | 370/225 |
| 5,636,203 | 6/1997 | Shah | 370/244 |
| 5,646,936 | 7/1997 | Shah et al. | 370/228 |
| 5,812,524 | 9/1998 | Moran et al. | 370/228 |

FOREIGN PATENT DOCUMENTS

| | | |
|---|---|---|
| 0 494 513 A2 | 12/1991 | European Pat. Off. . |
| WO 95/10149 | 4/1995 | WIPO . |

OTHER PUBLICATIONS

Herzberg et al. "The Hop–Limit Approach for Spare–Capacity Assignment in Survivable Networks" IEEE Dec. 3, 1995.

Dighe, et al. "A Link Based Alternative Routing Scheme for Network Restoration under Failure" IEEE May 1995.

Grover et al. "Near Optimal Spare Capacity Planning in a Mesh Restorable Network" IEEE Jan. 1991.

Hasegawa et al. "Dynamic Reconfiguration of Digital Cross–Connect Systems with Network Control and Management" IEEE.

Bellary, et al. "Intelligent Transport Network Survivability: Study of Distributed and Centralized Control Techniques" IEEE 1990.

Shimazaki et al. "Neopilot: An Integrated ISDN Fault Management System" IEEE Feb. 1990.

Shimazaki et al. "Network Fault Management" Sep. 1992.

Newport, et al. "Network Survivability Through Connectivity Optimization" IEEE 1987.

Flanagan et al. "Principles and Technologies for Planning Survivability—A Metropolitan Case Study", IEEE 1989.

(List continued on next page.)

*Primary Examiner*—Douglas W. Olms
*Assistant Examiner*—Seema S. Rao

[57] ABSTRACT

A method and system for initiating distributed restoration of a communications network following the failure of one or more network components. Restoration is conducted in a distributed fashion by all the restoration nodes of the network. When a restoration node detects failure of a segment connected to it, the restoration node monitors its segments for a period of time and then sends a failure message to other restoration nodes of the network indicating the number of segments connected to it that have failed. When restoration nodes receive failure messages, they compare the count of failed segments contained in the messages to a range of counts of failures for the detecting node that are locally stored on each restoration node. By this comparison, the restoration nodes can determine whether the network has quiesced to a relatively stable state following a network outage. Once the network has reached a stable state, all the restoration nodes simultaneously initiate a local restoration process.

29 Claims, 5 Drawing Sheets

OTHER PUBLICATIONS

M. Wehr "Protection of Synchronous Transmission Networks", Commutation and Transmission, No. 4, 1993.

Coan, et al. "Using Distributed Topology Update and Pre-planned Configurations to Achieve Trunk Network Survivability" IEEE Oct. 1991.

Manione et al. "An Inconsistencies Tolerant Approach in the Fault Diagnosis of Telecommunications Networks" Feb. 14, 1994.

Bouloutas, et al. "Alarm Correlation and Fault Identification in Communication Networks" Feb. 1, 1994.

Application No. 08/493,741, filed Jun. 22, 1995, System And Method For Reconfiguring A Telecommunications Network To Its Normal State After Repair Of Fault.

Application No. 08/632,198, filed Apr. 15, 1996, Minimum Common Span Network Outage Detection And Isolation.

Application No. 08/632,200, filed Apr. 15, 1996, Dynamic Network Topology Determination.

Application No. 08/669,259, filed Jun. 21, 1996, Topology–Based Fault Analysis In Telecommunications Network.

Application No. 08/670,872, filed Jun. 26, 1996, Segment Substitution/Swap For Network Restoration Pre–plans.

Application No. 08/673,415, Jun. 28, 1996, Realtime Restoration Process.

Application No. 08/701,514, filed Aug. 22, 1996, Enhanced Voice Services Load Balancing.

Application No. 08/758,111, Nov. 25, 1996, Method And Apparatus For Determining Maximum Network Failure Spans For Restoration.

Application No. 08/753,558, Nov. 26, 1996, Method And Apparatus For Deriving And Representing Physical Network Topology.

Application No. 08/753,559, filed Nov. 26, 1996, Method And Apparatus For Isolating Network Failures By Applying Alarms To Failure Spans.

Application No. 08/753,553, filed Nov. 26, 1996, Method And Apparatus For Identifying Restoral Routes In A Network.

Application No. 08/753,560, filed Nov. 26, 1996, Method And Apparatus For Isolating Network Failures By Correlating Paths Issuing Alarms With Failure Spans.

Application No. 08/774,599, filed Dec. 30, 1996, Method And System Of Distributed Network Restoration Using Preferred Routes.

Application No. 08/777,437, Dec. 30, 1996, Method And System of Distributed Network Restoration With Multiple Failures.

Application No. 08/777,416, filed Dec. 30, 1996, Method And System For Selecting Preferred Nodes For Distributed Network Restoration.

Application No. 08/777,877, filed Dec. 31, 1996, Method And Apparatus For Creating Preferred Routes For Network Restoration.

Application No. 08/775,220, Dec. 31, 1996, Centralized Restoration Of Network Using Preferred Routing Tables To Dynamically Build An Available Preferred Restoral Route.

Application No. 08/775,222, filed Dec. 31, 1996, Method And Apparatus For Automated Node–Based Normalization After Network Restoration.

Application No. 08/775,221, filed Dec. 31, 1996, Integration Of A Centralized Network Restoration System With A Distributed Network Restoration System.

Application No. 08/885,712, filed Jun. 30, 1997, Method And System For Assigning Spare Transmission Links To Restoral Routes.

Application No. 08/884,710, filed Jun. 30, 1997, Method And Systme for Pre–Patching A Communications Network.

Application No. 08/884,716, filed Jun. 30, 1997, Method And System For Augmenting A Communication Network With Spare Capacity.

Application No. 08/904,095, filed Jul. 31, 1997, Dynamic Route Generator.

Application No. 08/910.912, filed Aug. 13, 1997, Distributed Method And System For Excluding Components From A Restoral Route In A Communications Network.

Application No. 08/910,911, filed Aug. 13, 1997, Centralized Method And System For Excluding Components From A Restoral Route In A Communications Network.

Application No. 08/938,671, Sep. 30, 1997, System And Method For Emulating Network Outages Using A Segmented Architecture.

METHOD FOR INITIATING A DISTRIBUTED RESTORATION PROCESS

CROSS-REFERENCE TO RELATED APPLICATIONS

This application is related to the following U.S. patent applications which are being filed concurrently and are hereby incorporated by reference: Ser. No. 08/910,911 CENTRALIZED METHOD AND SYSTEM FOR EXCLUDING COMPONENTS FROM A RESTORAL ROUTE IN A COMMUNICATIONS NETWORK AND DISTRIBUTED METHOD, now pending, and SYSTEM FOR EXCLUDING COMPONENTS FROM A RESTORAL ROUTE IN A COMMUNICATIONS NETWORK U.S. Ser. No. 08/910,912, now pending

TECHNICAL FIELD

The present invention relates to communication networks and, in particular, to the synchronization and timing of the initiation of a distributed restoration process.

BACKGROUND OF THE INVENTION

Telecommunications carriers (e.g., long distance providers) continually strive to increase the reliability of their communications networks. They do this, in part, by increasing the speed by which they can restore network operation following failure in one or more components of the network. A communications network consists of a collection of transmission links, also known as segments, that are interconnected at network nodes. The segments include transmission lines, fiber optic cables, microwave links, and other such transmission medium. Traffic is transmitted on the network from one endpoint to another endpoint through a current route or "trunk," which is a network path of segments that interconnect the endpoints. The network nodes may serve a variety of functions such as amplifying the network traffic for transmission down the next segment in the route or establishing an interconnection between two segments connected to the node (i.e., a switch). The restoration nodes can be controlled locally or from a remote computer system to connect or to disconnect segments that are connected to the node.

Unfortunately, the components (e.g., nodes and segments) of the communications network may occasionally fail, resulting in a network outage. When a segment fails, an alarm is raised at the restoration node to which it is connected. For example, a segment that is a buried fiber optic cable may fail as a result of being inadvertently severed by someone digging near the buried cable. If one or more of the cables fail, massive disruption of services to a large number of network customers could result. Therefore, telecommunications carriers strive to quickly and economically route the network traffic around such failed components by establishing a "restoral" route. A restoral route is a path between the endpoints that does not include the failed component. The establishing of a restoral route generally involves: (1) detecting that a component on the current route has failed, (2) identifying the location of the component, (3) selecting a restoral route to bypass the failed component, and (4) implementing the selected restoral route. The reliability of telecommunication networks depends in large part on the ability to detect such failures and implement the restoral route with minimal impact on network customers. A plan that identifies which restoration nodes are to be switched to bypass one or more specific failed components is called a "restoration plan."

The implementation of a restoration plan is typically controlled from a central location. That central location is responsible for coordinating notification of segment failures, determining when a restoration should be initiated, and sending messages to the appropriate restoration nodes in order to effect the necessary connections. It would be desirable to have a mechanism for initiating a restoration without the need for a central location to determine when to initiate the restoration. Such determination is helpful when the implementation of a restoration plan is carried out in a distributed fashion. In a distributed restoration system, each restoration node detects segment failures and makes those connections to spare segments necessary to bypass that failure. Because these actions are carried out in separate restoration nodes, there are timing and synchronization problems in a distributed restoration system that are not present in a centralized restoration system.

SUMMARY OF THE INVENTION

The present invention provides a method and system for initiating distributed restoration of a communications network following the failure of a number of network components. The distributed restoration initiation system of the present invention is executed simultaneously at each restoration node in the network. Upon failure of one or more segments connected to a restoration node, the system at that restoration node detects the failures, waits for a certain period of time in the event that additional failures will be quickly detected, and then sends a failure message to all network restoration nodes with an indication of the number of failed segments that the restoration node detected. If the receiving restoration node has not recently received (e.g., within a predefined time period) a failure message, then the system stores a count of the number of failed segments received in the failure message and delays initiation of restoration until it determines that the outage has stabilized. If, on the other hand, the receiving restoration node has recently received one or more failure messages, then the system compares the count in the received failure message with stored counts derived from previous failure messages and determines whether the network outage is still unstable. When the count in the most recently received failure message indicates that the outage is not stable, then the system at the restoration node that received the failure message again delays initiation of restoration. Finally, when there have been no indications of outage instability during the delay, then the system determines that the outage is stable. The system then determines whether the total number of reported failures exceeds a certain threshold. If so, the system initiates restoration at that restoration node. The system also filters out alarms that are caused by noise on a segment, referred to as false-positive failures. In this way, the system does not initiate restoration based on a count of failures that includes false-positive failures.

DETAILED DESCRIPTION OF THE INVENTION

The present invention provides a method and system for initiating distributed restoration of a communications network following the failure of a number of network components. The distributed restoration system of the present invention executes at each restoration node of the communications network. When a failure is detected at a restoration node, that restoration node notifies every other restoration node in the network. Because of these notifications, each restoration node has a complete picture of the failures. Also, because each restoration node uses the same algorithm to determine whether to initiate restoration, each restoration node will initiate restoration at the same or nearly the same time.

The restoration system contains a failure detection component and a restoration initiation component. The failure detection component detects network failures and notifies the other restoration nodes of the failures. The restoration initiation component receives the notifications and determines when to initiate restoration. Each restoration node on the network has a failure detection component and a restoration initiation component. When a failure detection component detects a failure, it sends to each other restoration node in the network a failure notification (e.g., failure message) indicating the number of failures that are currently detected (i.e., segments in alarm) at that restoration node. Since a restoration node is connected to each end of a segment, one of the restoration nodes is designated as the failure monitoring node. The failure detection component of the failure monitoring node is responsible for detecting the failures in the segment and sending the failure notification relating to that segment. The failure monitoring node for a segment can be arbitrarily designated, for example, as the restoration node with the lower restoration node identification number. The restoration initiation component at each restoration node in the network keeps track of the number of failures detected by every other restoration node. When the total number of failures detected at all restoration nodes exceeds a predefined threshold, then the restoration initiation component initiates restoration.

In one embodiment, the restoration initiation component delays the initiation of restoration until the number of detected failures (i.e., the outage) has stabilized. For example, if a cable containing multiple segments is being slowly damaged (e.g., being burned), then a restoration node may detect a failure in one segment and send a message indicating that one failure has been detected. It may then detect a failure in another segment and send a message indicating that two failures have been detected. Thus, it would be desirable to delay initiation of restoration until all these failures are detected. In this way, the full extent of the outage can be ascertained and the optimal restoral route selected. To help ensure that the outage has stabilized, the restoration initiation component at each restoration node resets a timer when it receives a failure notification. When the timer eventually expires because no failure notifications were received during the timer interval, the restoration initiation component assumes that all the failures have been detected (i.e., the outage has stabilized) and therefore initiates restoration.

The restoration initiation component also uses a technique to filter out detected failures that are actually a result of noise causing a segment being in alarm. For example, if a fiber-optic cable is bent temporarily, then the resulting noise may cause an alarm. Because the alarm is caused by noise on the segment, the alarm will presumably go away quickly. Failures detected as a result of such an alarm are referred to as "false-positive failures." When the failure detection component detects an alarm, it sends a failure notification indicating the number of segments connected to that node that are currently in alarm. As more failures are detected, then the number of segments in failure increases. However, if some of the failures are false-positive, the number of segments in alarm may vary between the number of actual failures detected so far and that number plus a number of false-positive failures. The restoration initiation component attempts to filter out these false-positive failures so (1) that initiation of restoration is not delayed because of noise and (2) that restoration is not initiated as a result of a false-positive failure causing the number of detected failures to exceed the threshold number of actual failures needed to initiate restoration. To filter out these false-positive failures, the restoration initiation component maintains a maximum number of total failures reported for the current outage and a minimum number of failures reported since that maximum number was established. Whenever the number of failures exceeds the maximum number previously detected, the restoration initiation component resets the maximum and minimum numbers. The maximum number represents the highest number of actual failures and false-positive failures that were reported at one time. If the number of current failures is less than the minimum number, then the restoration initiation component resets the minimum number. When the current number of failures is between the minimum and maximum numbers, then the restoration initiation system assumes either the number of failures above the minimum number represents either false-positive failures or actual failures that replace a previously reported false-positive failure. The restoration initiation component at each restoration node tracks these minimum and maximum numbers of failures reported by each restoration node. When the reported number of failures is not within the minimum and maximum numbers for the reporting restoration node, then the restoration initiation component assumes that the outage has not stabilized and resets the timer. If, however, a restoration node reports a number of failures that is within the minimum and maximum numbers, then the timer is not reset. In this way, the restoration initiation component will initiate restoration only after a time interval in which no indications of instability are received.

To prevent sending of an excess number of failure notifications by the failure detection component of each restoration node and to help the filtering of false-positive failures, the failure detection component combines some failures that occur at different times into a single notification. In particular, when a failure is detected, the failure detection component waits a certain time interval before sending notification. When the time interval expires, the failure detection component sends a failure notification indicating the number of segments currently in failure if that number is different than the last number reported by the node. Thus, if multiple actual failures occur within the time interval, then multiple failures are reported in one notification. Also, if a false-positive failure is detected, it may go away by the time the interval expires and would not be reported. When the time interval expires, the number of current failures may be the same as last reported and the sending of an additional failure message is avoided. The failure detection component could alternatively automatically send a failure notification if a predefined number of failures are current even if the timer has not expired. Using this filtering technique in certain situations, the failure detection component may not properly report that a new actual failure has occurred. For example, if the number of failures reported in a message includes four actual failures and one false-positive failure and then when the interval expires five actual failures are detected, then the failure detection component would not send a failure message. Thus, although the outage is still unstable, the restoration initiation components are not notified. Alternatively, the failure detection component could send a failure message indicating the same number of failures as in the previous failure notifications. The restoration initiation component upon receiving two failure notifications in a row with the same number could assume that the outage is unstable and reset the timer. The restoration initiation component also tracks the current number of failures reported by each restoration node. When the restoration initiation component determines that the outage has stabilized, it initiates restoration when the total of the current numbers of failures reported by each restoration node exceeds the threshold.

The restoration initiation system solves various timing and synchronization problems that occur when restoration is distributed. First, because each restoration node reports a failure to the other restoration nodes and because each restoration node uses the same algorithm to ascertain when restoration should be initiated, all restoration nodes begin the process more or less simultaneously. Second, the restoration initiation system provides a technique by which false-positive failures can be disregarded when ascertaining when to initiate restoration. Third, the restoration initiation system also provides a technique to help ensure that all related failures are detected (i.e., the outage is stabilized) before restoration is initiated. In this way, restoration is not initiated until the full extent of a failure has been ascertained. Fourth, the restoration initiation system ensures that restoration is only initiated when a certain threshold number of failures has been detected. Finally, if the restoration initiation system at a restoration node initiates a restoration, which should not have been initiated but for a delay in receiving a notification from another restoration node, the restoration process is aborted when the delayed notification is eventually received.

Figure 1:
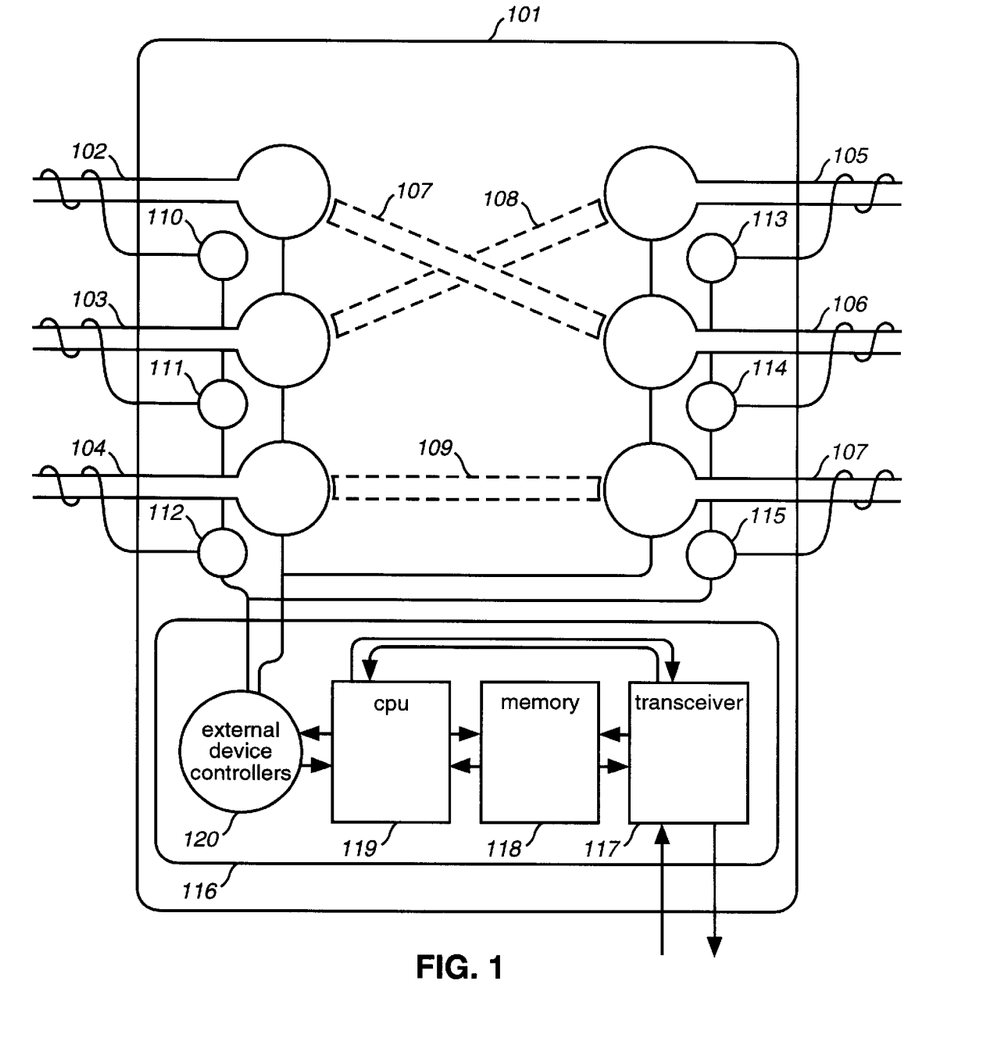
FIG. 1 is a block diagram of a restoration node on which the distributed restoration initiation system is implemented.

FIG. 1 is a block diagram of a restoration node on which the distributed restoration initiation system is implemented. The restoration node 101 has three input segments 102–104 and three output segments 105–107. The restoration node connects input segment 102 to output segment 106 through the internal connector 107 and likewise connects the remaining input segments to the remaining output segments through internal connections 108–109. The restoration node includes detection devices 110–115 that each detect failures on one of the input or output segments. Common detection devices include lightwave transmitting equipment devices. Detection device 110, for example, detects failures on input segment 102. The restoration node also includes a special purpose computing device 116. The computing device includes memory 118, a central processing unit (CPU) 119, and an external device controller 120. The external device controller is connected to the internal switching mechanisms such that the CPU can direct destruction of existing connections and creation of new connections between input segment and output segments. The external device controller is also connected to the detection devices so that, when a failure occurs on an input or output segment, the external device controller can generate an alarm that awakens or initiates one or more tasks running on the central processing unit. The restoration nodes can send messages to one another via the segments. The computing device may also include a transceiver 117, which provides alternate means for sending messages between restoration nodes. In general, each restoration node forwards the messages it receives to the other restoration nodes to which it is directly connected. In this way, the messages propagate throughout the communications network.

Figure 2:
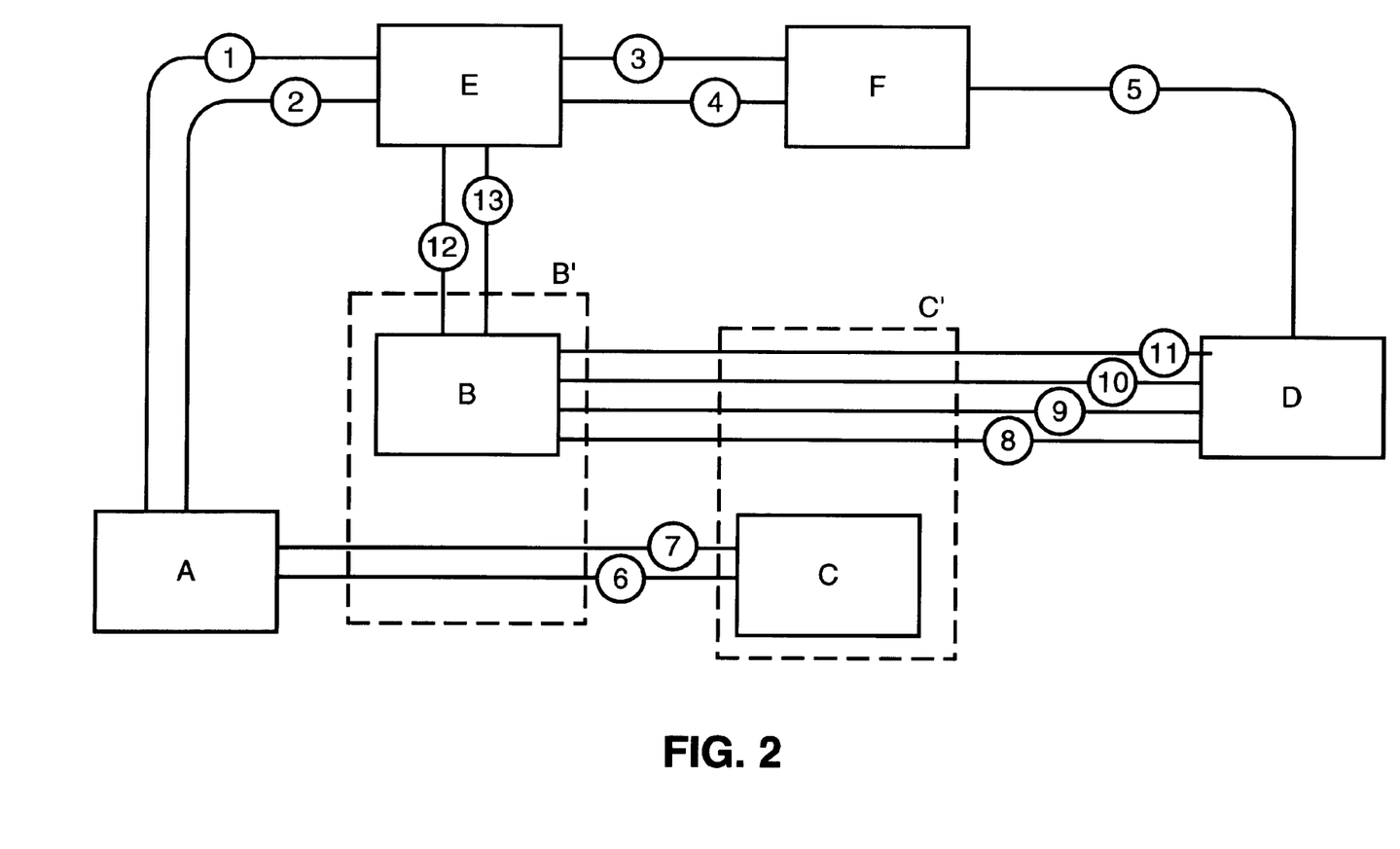
FIG. 2 is a schematic drawing of an example communications network.

FIG. 2 is a schematic drawing of an example communications network. The communications network includes six restoration nodes A–F. These restoration nodes interconnect segments 1–13. The dashed-line boxes represent physical installations B' and C' that contain restoration nodes and other telecommunications equipment. Of course, each restoration node is at a physical installation but only installations B' and C' are referred to in this example. Physical installation B' contains restoration node B. Segments 6–7 pass through installation B' and segments 8–13 terminate at installation B' (i.e., connect to restoration node B). Installation C' contains restoration node C. Segments 6–7 terminate at installation C', and segments 8–11 pass through installation C'.

The example network of FIG. 2 illustrates a case where a restoration node cannot by itself detect all segment failures in a network that result from a single cable failure. Suppose that segments 6–11 are bundled together into a single cable upon leaving installation B' and that the single cable extends to installation C', where segments 6 and 7 are separated from segments 8–11. Segments 6 and 7 terminate at restoration node C, and segments 8–11 pass through installation C' and terminate at restoration node D. If the single cable between installations B' and C' is broken by, for example, a back hoe operator digging a trench for a new cable, all six segments 6–11 will fail. Restoration nodes A and C can potentially detect failures of segments 6 and 7 and restoration nodes B and D can potentially detect failures of segments 8–11, but none of the restoration nodes can detect failures of all six segments 6–11. Having only localized information, restoration nodes may not initiate restoration when the global state of the network requires immediate restoration. Even if restoration is initiated, a restoration node having only local information may choose replacement segments known to other restoration nodes to have failed, or incorrectly prioritize restoration of segments.

Figure 3A:
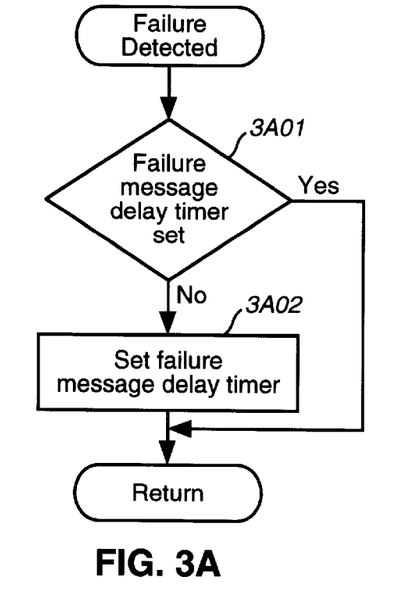
FIG. 3A is a flow control diagram of the processing performed when a failure is detected.
Figure 3B:
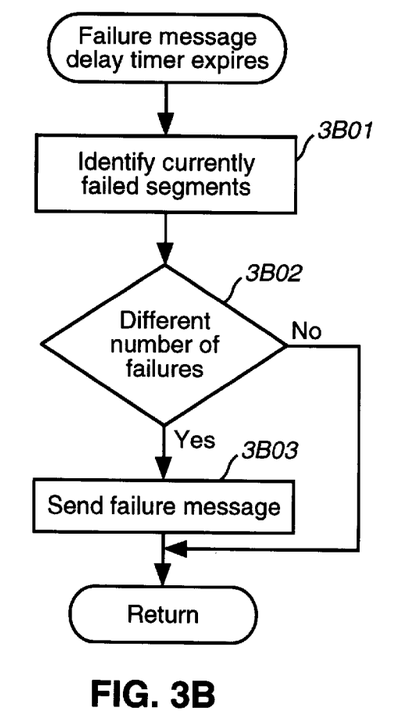
FIG. 3B is a flow control diagram of the processing performed when the "failure message delay" timer expires.

FIGS. 3A–3B and 4A–4B are flow control diagrams for the software program that implements the distributed restoration initiation system. FIGS. 3A–3B are flow control diagrams of an implementation of the failure detection component. The component sets a "failure message delay" timer whenever a failure is detected and the timer is not already set. When the timer expires, then the component sends a failure message. The effect of this timer is that, once a failure is detected, subsequent failures that occur before the expiration of the timer are reported in the failure message. Also, false-positive failures may go away before the expiration of the timer and thus not be reported at all. FIG. 3A is a flow control diagram of the processing performed when a failure is detected. In step 3A01, if the "failure message delay" timer is currently set, then the component returns, else the component continues at step 3A02. In step 3A02, the component sets the timer and returns. FIG. 3B is a flow control diagram of the processing performed when the "failure message delay" timer expires. In step 3B01, the component identifies which segments currently are in alarm. In step 3B02, if a different number of segments are currently in alarm from when last reported, then the component continues at step 3B03, else the component returns. In step 3B03, the component sends the failure message indicating the number of segments currently in alarm to all other restoration nodes.

Figure 4A:
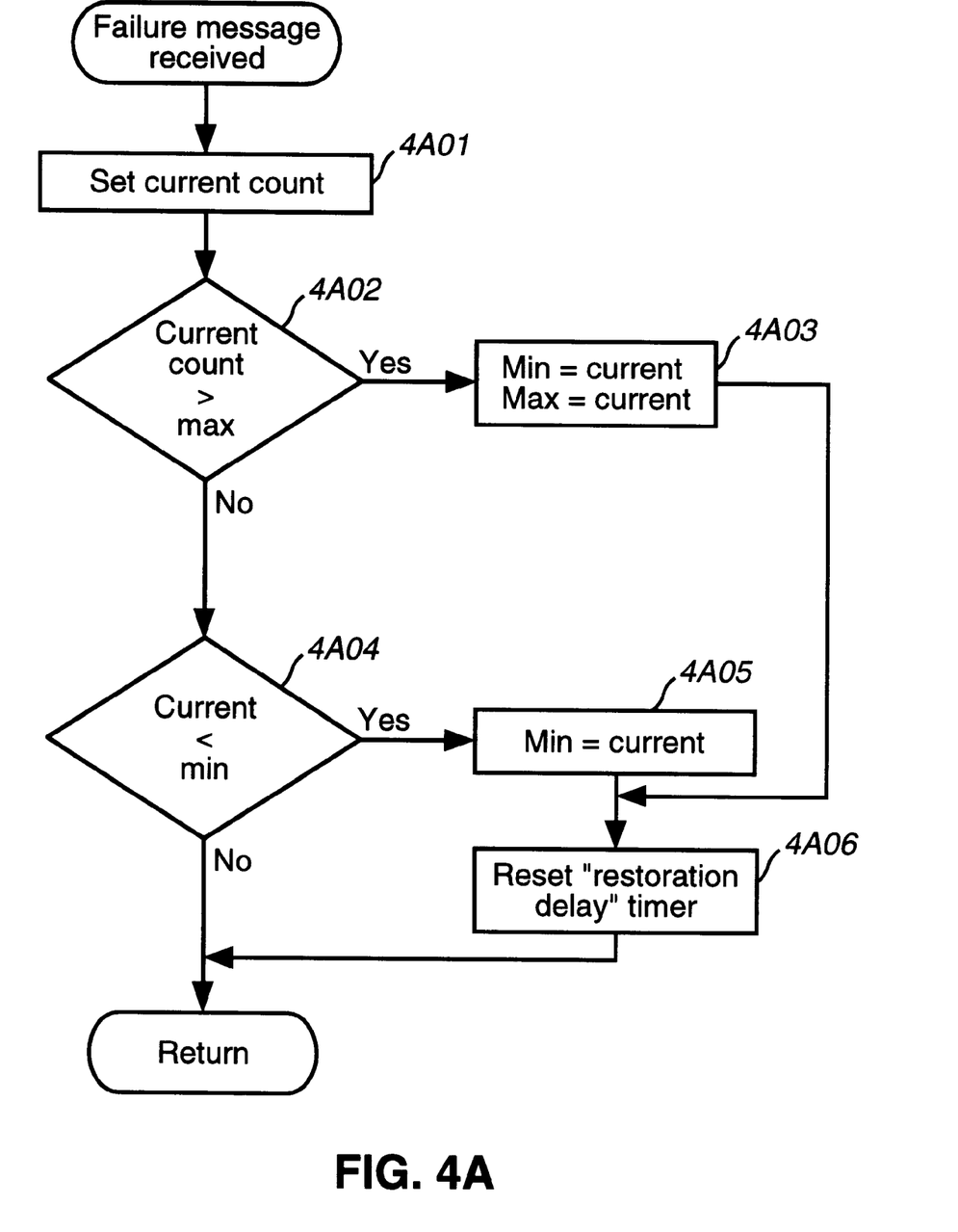
FIG. 4A is a flow control diagram of the processing performed when a failure message is received from a restoration node.
Figure 4B:
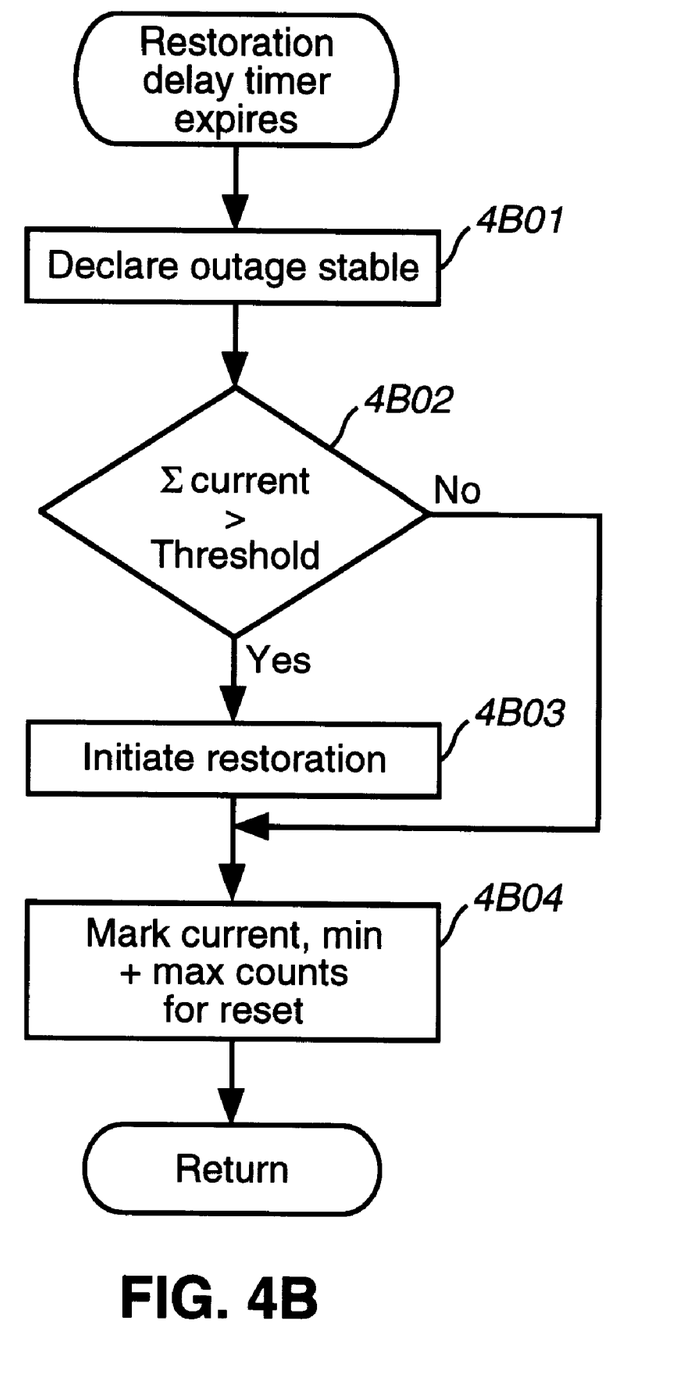
FIG. 4B is a flow control diagram for processing performed when the "restoration delay" timer expires.

FIGS. 4A and 4B are flow control diagrams of an implementation of the restoration initiation component. The component tracks the minimum, current, and maximum failure counts reported by each restoration node since the last time an outage was declared stable. Whenever the component receives a failure message, it updates the minimum, current, and maximum counts, as appropriate, for the restoration node that is reporting the failures. If the count in the failure message is outside the range of the minimum and maximum number, then a "restoration delay" timer is reset. When the timer expires, the outage is declared stable and the restoration is initiated if the total of the current counts of failures of all the restoration nodes exceeds a predefined threshold count. FIG. 4A is a flow control diagram of the processing performed when a failure message is received from a restoration node. In step 4A01, the component sets the current count of failures for the restoration node that detected the failure to the count in the message. In step 4A02, if the current count is greater than the maximum count, then the component resets both the minimum and maximum count to the current count in step 4A03. In step 4A04, if the current count is less than the minimum count, then the component resets the minimum count to the current in step 4A05. If the minimum or maximum counts have been reset, then the component resets the "restoration delay" timer in step 4A06 before returning.

FIG. 4B is a flow control diagram for processing performed when the "restoration delay" timer expires. In step 4B01, the component determines that the outage has stabilized following one or more failures. In step 4B02, if the total of the current count of failures for each restoration node exceeds a threshold count, then the component continues at step 4B03, else the component continues at step 4B04. In step 4B03, the component initiates the restoration process. In step 4B04, the component marks the minimum, current, and maximum count for all restoration nodes to be reset to zero. These counts are not reset immediately so that if a failure message that should have been received before the timer expires is received after the timer expires, then processing can continue with the counts set to their values when the timer expired. If no such delayed failure message is received for a certain time interval (e.g., equal to another "restoration delay" timer interval), then the counts are reset.

If the restoration process is initiated, the restoration system still monitors the failure messages that it receives. If a failure message is delayed for some reason, then the system may need to abort (and possibly undo some restoration actions) the restoration process when the message is received. For example, if a delayed failure message is received that would place the total count of current failures below the threshold level, then the initiated restoration would need to be aborted. In this way, the effects of delays in receiving a failure message can be avoided and the restoration nodes would remain in synchronization. Also, the count of failures for each restoration node would need to be reset to their values prior to the initiation of the restoration.

The following example will illustrate the filtering process by a detecting restoration node and the detecting of a stable outage by a receiving restoration node. Referring to FIG. 2, if node A detects a failure on segment 1, then the failure detection component will set the "failure message delay" timer. When the timer expires, node A may detect that both segments 1 and 2 are in alarm. In such a case, node A sends a single failure message indicating a count of 2. If, however, when the timer expires, the failure detection component detects that segment 1 is no longer in alarm, then node A does not send any failure message. That is, segment 1 went into alarm because of noise and the failure was a false-positive failure. Thus, the detection failure component, both groups multiple failures that occur during the duration of the timer and filters out some false-positive failures.

If restoration node B detects a failure on segments 8 and 9, then restoration node B would send a failure message to each other restoration node. The other restoration nodes would set the minimum and maximum value to 2 for restoration node B. If restoration node B then detects a failure on segment 10, then restoration node B would again send a failure message but this time with a count of 3 since segments 8, 9, and 10 are currently in failure. The other restoration nodes would then reset the minimum and maximum count for restoration node B to 3. If restoration node B then detects that segment 8 is no longer in alarm (e.g., a false-positive failure had occurred), then restoration node B would send a failure message to the other nodes indicating the count of 2 . When the other nodes receive the failure message, they would notice that the count of 2 is below the current minimum for restoration node B and thus would set the minimum count to 2 and reset the timer. If segment 11 then went into alarm, restoration node B would send a failure message with a count of 3. Each node would notice that the count of 3 is between the minimum and maximum number and not reset the timer. Finally, when the timer expires, if the total of the current counts exceeds a threshold, then restoration is initiated.

The distributed restoration initiation system thus accomplishes several goals. First, all restoration nodes of the network are continuously updated with segment failure information detected by each restoration node. Thus, all restoration nodes become more or less simultaneously aware when the number of segment failures exceeds a threshold, requiring initiation of a restoration process. However, the restoration initiation system also ensures that restoration is not begun until the outage has stabilized. Restoration nodes continue to wait and monitor the state of the network until they do not detect additional failures. Moreover, before sending a failure message, restoration nodes wait a certain period of time in case additional failures are quickly detected so that an unnecessarily large number of failure messages are not sent. Finally, each restoration node has a complete global picture of the state of the network, enabling each restoration node to choose appropriate restoration plans and to correctly prioritize incorporation of selected spare segments to restore the network.

Although the present invention has been described in terms of one embodiment, it is not intended that the invention be limited to this embodiment. Modifications within the spirit of the invention would be apparent to those skilled in the art. For example, the present invention can be used for directing the decision of when to begin a restoral process on any type of distributed communications network (e.g., Internet or other computer-based network). The scope of the present invention is defined by the claims that follow.

We claim:

1. A method for initiating distributed restoration of a communications network following a network outage, the communications network having segments that carry network traffic and restoration nodes that interconnect segments, the method carried out at each restoration node comprising:

upon detecting failure of a segment connected to the restoration node, waiting for a certain period in order to detect any further failures; and after waiting for the certain period, sending a failure message to other restoration nodes indicating a count of failed segments; and upon receiving a failure message, storing the count of the failed segments in the received failed message as a current count of failed segments for the restoration node that detected the failed segments;

when no failure message has been recently received, setting a timer;

when a failure message has been recently received, ascertaining whether the count of the failed segments in the failure message indicates that the outage is not stable; and when it is ascertained that the outage is not stable, resetting the timer; and when the timer expires and when a total of the current counts of all restoration nodes is greater than a certain threshold, initiating network restoration.

2. The method of claim 1 wherein the restoration node stores, for each restoration node, a minimum count of failed segments and a maximum count of failed segments.

3. The method of claim 2 wherein when a failure message is received with a count of the failed segments that is outside the minimum and maximum count, then the outage is not stable.

4. The method of claim 2 wherein when no failure messages have been recently received, the minimum and the maximum count both have values of 0.

5. A method for initiating distributed restoration of a communications network following a network outage, the communications network having segments that carry network traffic and having restoration nodes, the method carried out at each restoration node and comprising for a particular restoration node:

detecting failures in network components and reporting a count of those failures to other restoration nodes in the communications network;

receiving reported failure counts from other restoration nodes; and when the count of reported failures received from other restoration nodes has stabilized over a certain period of time, initiating a restoration process.

6. The method of claim 5 wherein restoration is only initiated when the total count of the failures reported by each restoration node exceeds a threshold.

7. The method of claim 5 wherein a restoration node waits for a certain period of time between detecting a first failure and reporting a count of detected failures.

8. The method of claim 7 wherein a restoration node reports a count of failures only when the count includes failures not previously reported.

9. The method of claim 8 wherein a restoration node maintains a minimum count of reported failures and a maximum count of reported failures.

10. The method of claim 9 wherein when the restoration node has not received a report of a count of failures within a certain period of time, the minimum count of reported failures and the maximum count of reported failures both have a value of 0.

11. The method of claim 5 wherein a restoration node detects instability in the count of reported failures by comparing the most recently received report of the count of failures for a detecting restoration node to a maintained minimum count of reported failures and maximum count of reported failures, instability indicated by the most recently received report of the count of failures exceeding the maximum count of reported failures or by the most recently received report of the count of failures falling below the minimum count of reported failures.

12. The method of claim 11 wherein when a current count of reported failures exceeds the maximum count, resetting the maximum count and minimum count to the current count.

13. The method of claim 11 wherein when a current count of reported failures is less than the minimum count, resetting the minimum count to the current count.

14. A distributed restoration system for detecting when to initiate restoration in a communications network following a network outage, the communications network having segments and having restoration nodes, comprising at each restoration node:

a failure detection component that detects failures in the network and reports a count of those failures to other restoration nodes in the network; and a restoration initiation component that receives the reported failure counts from other restoration nodes and when the count of reported failures received from other restoration nodes has stabilized over a certain period of time, initiates a restoration process.

15. The system of claim 14 wherein restoration is only initiated when the total count of the failures reported by each restoration node exceeds a threshold.

16. The system of claim 14 wherein a restoration node waits for a certain period of time between detecting a first failure and reporting a count of detected failures.

17. The system of claim 16 wherein a restoration node reports a count of failures only when the count includes failures not previously reported.

18. The system of claim 17 wherein a restoration initiation component maintains a minimum count of reported failures and a maximum count of reported failures.

19. The system of claim 18 wherein when the restoration node has not received a report of a count of failures within a certain period of time, the minimum count of reported failures and the maximum count of reported failures both have a value of 0.

20. The system of claim 14 wherein the restoration initiation component detects instability in the count of reported failures by comparing the most recently received report of the count of failures for a detecting restoration node to a maintained minimum count of reported failures and maximum count of reported failures, instability indicated by the most recently received report of the count of failures exceeding the maximum count of reported failures or by the most recently received report of the count of failures falling below the maximum count of reported failures.

21. The system of claim 20 wherein when a current count of reported failures exceeds the maximum count, the restoration initiation component resets the maximum count and minimum count to the current count.

22. The system of claim 20 wherein when a current count of reported failures is less than the minimum count, the restoration initiation component resets the minimum count to the current count.

23. A method for determining when to initiate restoration following an outage in a network, the network having nodes that connect segments to form a traffic-bearing trunk, the method comprising:

when a failure is detected, notifying other nodes that a failure has been detected;

when notified that a failure has been detected, determining whether the outage has stabilized based on counts of failures detected by the nodes; and when the outage has not stabilized, delaying initiation of restoration; and when the outage has stabilized, initiating restoration.

24. The method of claim 23 wherein the notifying of other nodes is delayed for a time interval so that multiple failures can be reported in the same notification.

25. The method of claim 23 wherein the notifying of other nodes is delayed for a time interval to effect filtering of false-positive failures.

26. The method of claim 23 wherein the determining of whether the outage has stabilized includes ascertaining whether a previous count of failures reported by a node may represent one or more false-positive failures.

27. The method of claim 23 including after restoration is initiated:

receiving notification that a failure has occurred;

when the restoration would not have been initiated if the notification was received before restoration was initiated, aborting restoration.

28. The method of claim 23 wherein the determining of whether the outage has stabilized includes filtering out false-positive failures.

29. The method of claim 23 wherein the outage has stabilized, initiating restoration when the count of detected failures exceeds a threshold.

* * * * *